April 3, 1951     E. E. HALLANDER     2,547,205
FILTER APPARATUS
Filed Sept. 3, 1947     4 Sheets-Sheet 1
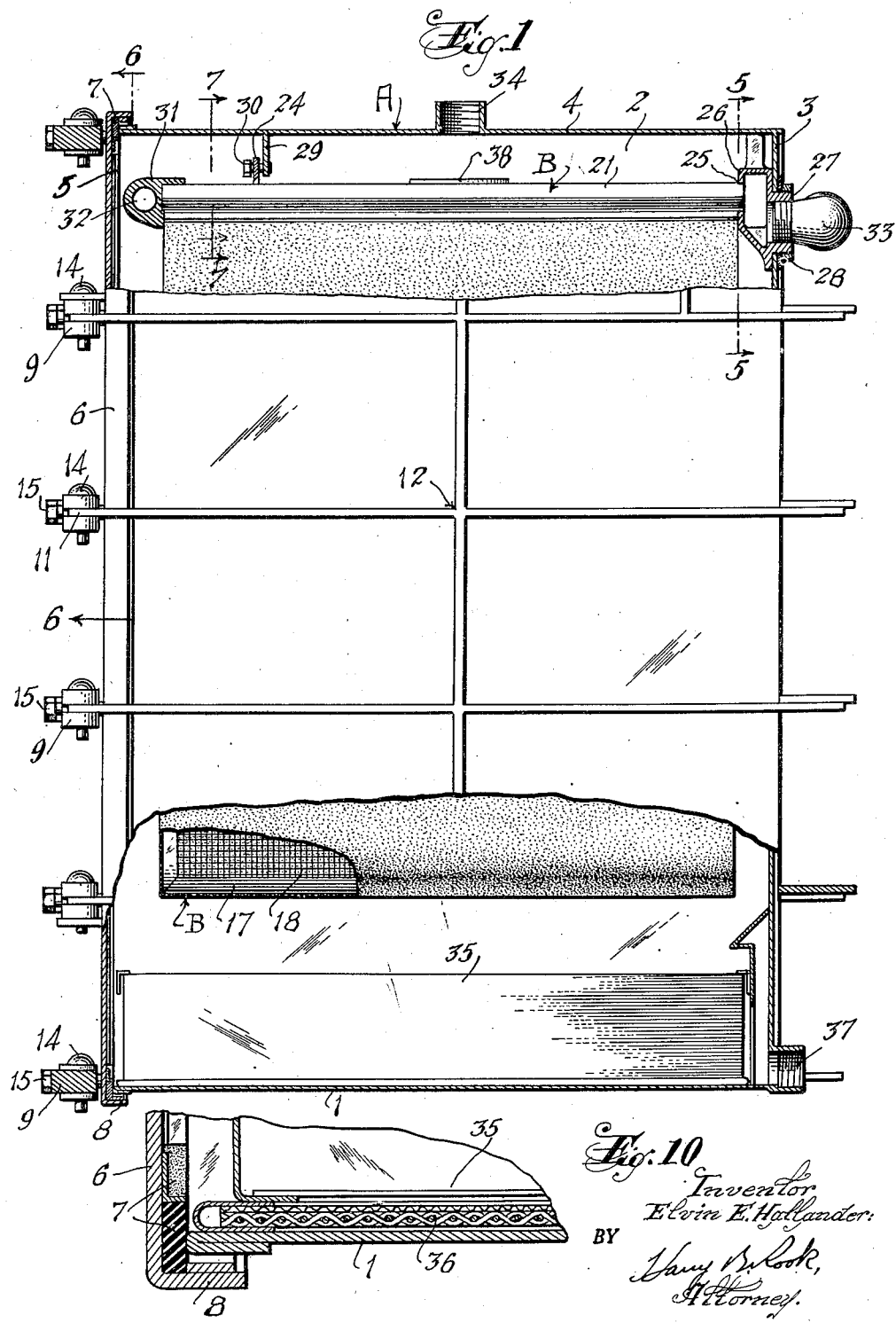
Inventor
Elvin E. Hallander
BY April 3, 1951 — E. E. HALLANDER — 2,547,205
FILTER APPARATUS
Filed Sept. 3, 1947 — 4 Sheets—Sheet 2
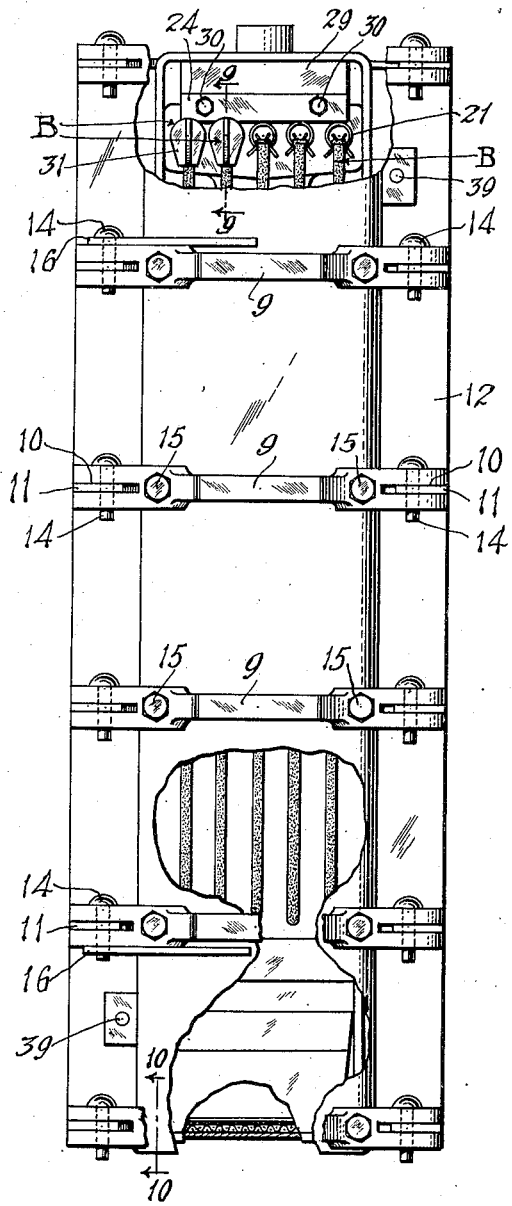
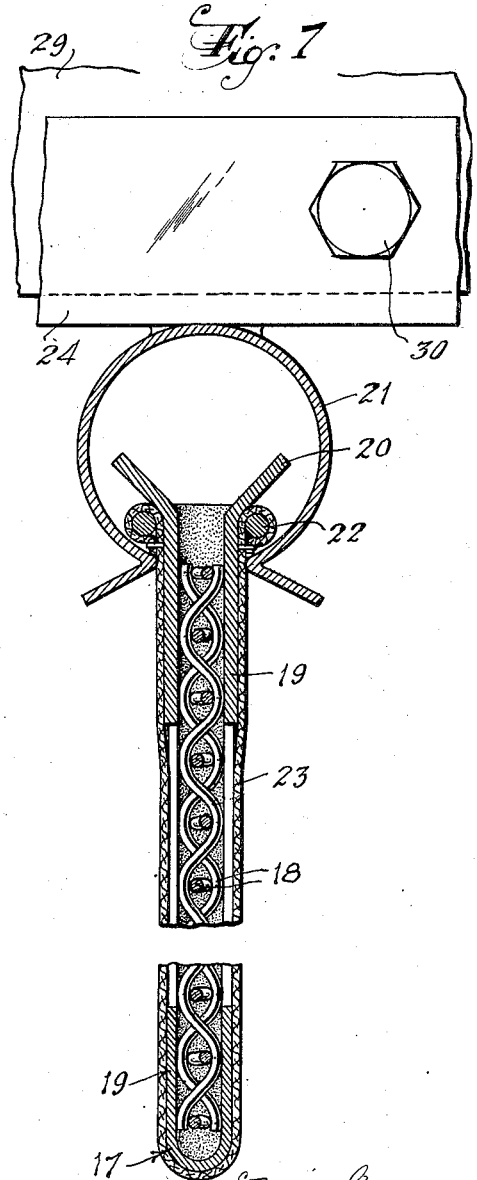
Inventor:
Elvin E. Hallander
BY Harry B. Cook,
Attorney.

April 3, 1951     E. E. HALLANDER     2,547,205
FILTER APPARATUS
Filed Sept. 3, 1947     4 Sheets-Sheet 3
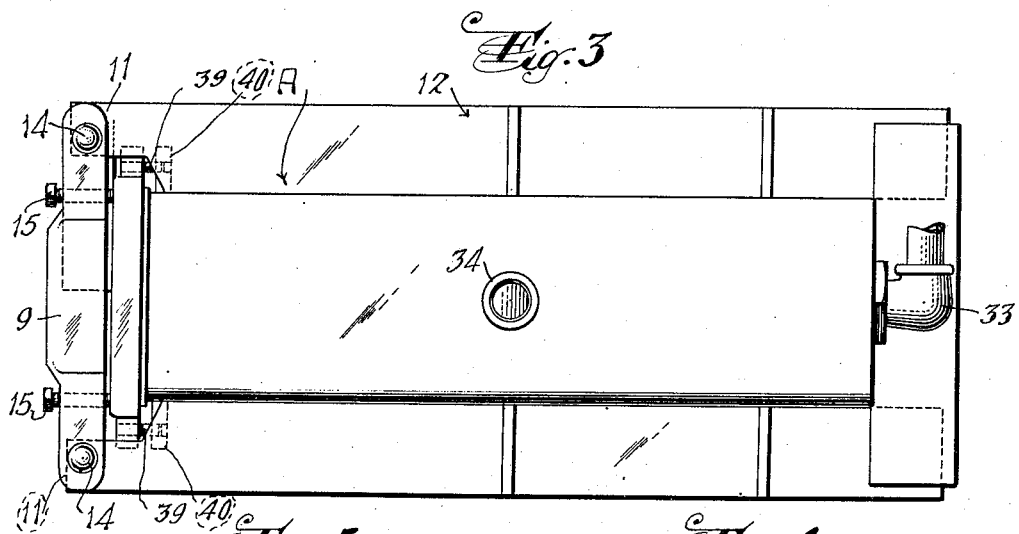
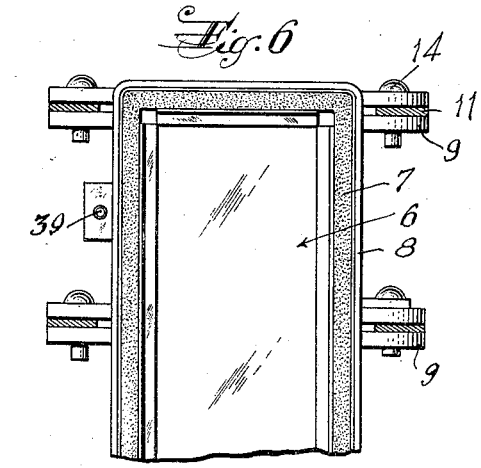
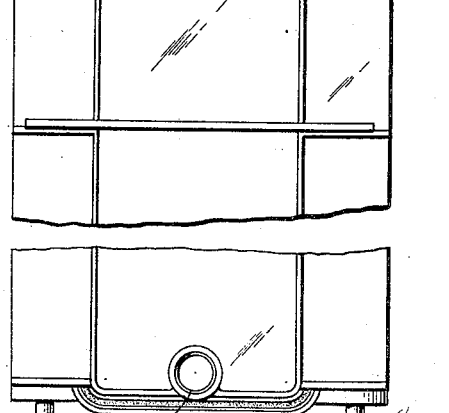

April 3, 1951 E. E. HALLANDER 2,547,205
FILTER APPARATUS
Filed Sept. 3, 1947 4 Sheets—Sheet 4
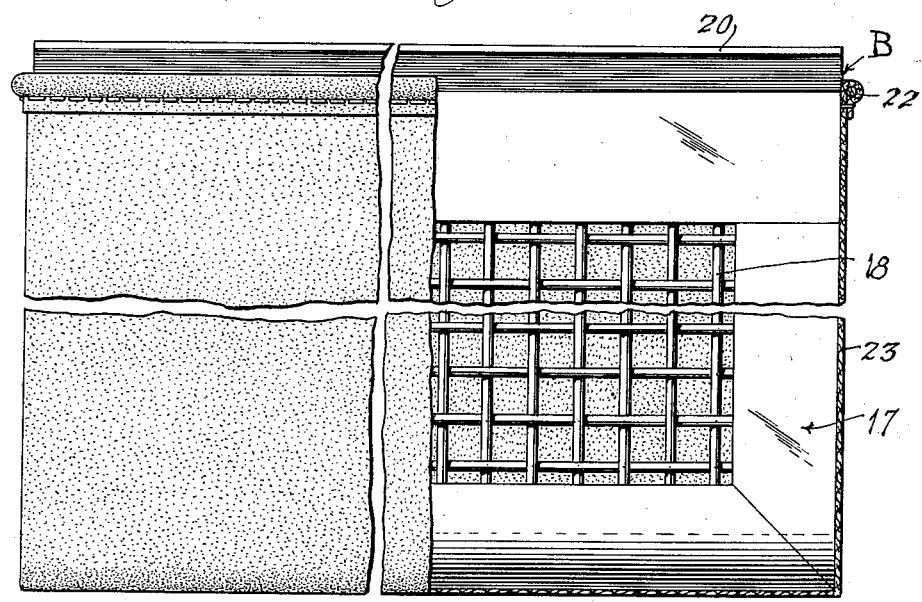
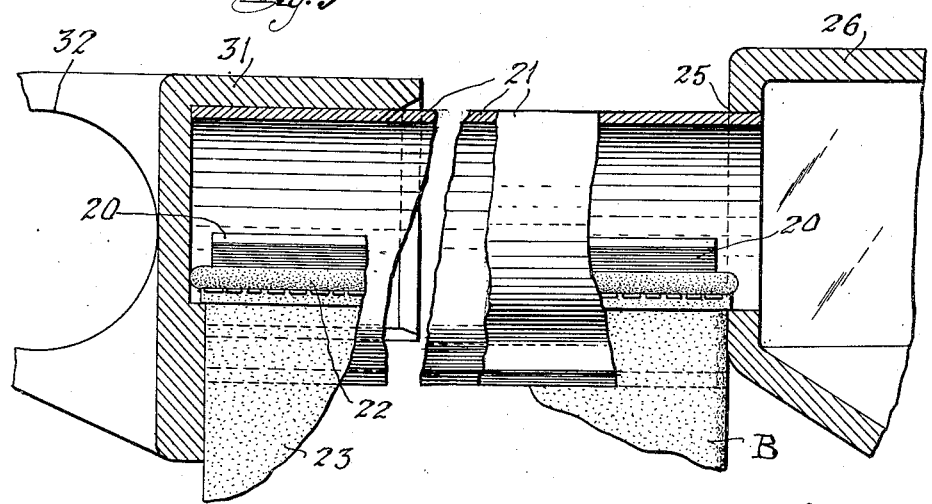
Inventor:
Elvin E. Hallander
BY
Harry N. Cook
Attorney.

Patented Apr. 3, 1951

2,547,205

UNITED STATES PATENT OFFICE 2,547,205

FILTER APPARATUS

Elvin E. Hallander, West Caldwell, N. J., assignor, by mesne assignments, to International Projector Corporation, Bloomfield, N. J., a corporation of Delaware Application September 3, 1947, Serial No. 771,904

6 Claims. (Cl. 210—181)

This invention relates to a filter and particularly a filter for solutions used in dry cleaning operations.

One object of the invention is to provide filter apparatus which shall embody novel and improved features of construction, whereby the apparatus shall operate with high efficiency and for relatively long periods of time without cleaning of the filter elements.

Some dry cleaning solutions are heavier than water, and my invention contemplates a filter particularly adapted for use with such solutions. As is known in the art, the filter elements usually comprise perforate frames covered by filter cloths or bags, and powdered filtering compounds are placed in the solvent to be filtered before it enters the filtering apparatus, so that the powder may build up on the filter cloth and form an efficient filtering medium. The dry cleaning solutions or solvents as they come to the filter usually also carry water, and the water has a tendency to clog the filter cloth if it permeates the powder into contact with the cloth. With my construction, the powder will be deposited initially on the upper portions of the filter elements and thus provide a barrier against water coming into contact with the filter cloths, it being understood that the water will normally lie at the top of the liquid because the solvent is heavier than water.

Another object is to provide a filter apparatus which shall have a novel and improved construction and arrangement of a tank, the inlet therefor, filter elements and the outlet, whereby the liquid to be filtered shall flow into the tank at the top and after having passed through the filter elements shall flow outwardly from the top of the tank.

A further object of the invention is to provide a novel and improved means for suspending the filter elements at their upper edges, whereby they will be held in spaced approximately parallel relation by action of gravity, thereby eliminating the necessity for bottom rails or racks and the complications and expense incident thereto.

Still another object is to provide a novel and improved combination of a tank having an opening at one end thereof through which the filter elements may be inserted, and means for suspending the filter elements in the tank at their upper edges so that they may be inserted in and removed from the casing through said opening by a simple sliding action.

Another object is to provide a novel and improved construction and combination of a tank, filter elements, an inlet and an outlet, whereby the filter can be easily and quickly cleaned by back-washing without the necessity for removing the filter element and so that the wash liquid will flow outwardly at the upper portion of the tank while the filtering compounds and other non-floatable matter will sink to the bottom of the tank from which they can be easily removed.

Other objects are to provide a novel and improved filter element which shall include a perforated frame, a filter bag fitted thereover and means for clamping the open end of the bag on the frame; to provide novel and improved means for suspending such a filter element in a tank, and to obtain other advantages and results that will be brought out by the following description in conjunction with the accompanying drawings, in which Figure 1 is a side elevational view of a filter apparatus embodying my invention, with portions broken away and shown in section for clearness in illustration;

Figure 2 is a front elevational view of the filter apparatus, with portions broken away;

Figure 3 is a top plan view thereof;

Figure 4 is a rear elevational view of the filter;

Figure 5 is a fragmentary transverse vertical sectional view, approximately on the plane of the line 5—5 of Figure 1;

Figure 6 is a similar view, approximately on the plane of the line 6—6 of Figure 1, observing the inner side of the door;

Figure 7 is a greatly enlarged transverse vertical sectional view through one of the filter elements and a portion of its suspending means;

Figure 8 is a greatly enlarged side elevational view of one of the filter frames and its corresponding filter bag detached from the suspending means;

Figure 9 is a fragmentary composite sectional elevational view, approximately on the plane of the line 9—9 of Figure 2, and Figure 10 is an enlarged fragmentary vertical longitudinal sectional view, approximately on the plane of the line 10—10 of Figure 2.

Specifically describing the illustrated embodiment of the invention, the filter apparatus includes a tank A having a bottom wall 1, side walls 2, a rear wall 3 and a top wall 4. The other end of the tank has an opening 5 which is normally closed by a door 6 which has a packing 7 to provide a water-tight joint between the door and the edges of the opening 5. The door has a perimetral flange 8 which telescopes over the walls of the tank at the edges of the opening 5, and the door is held in closed position by a plurality of bars 9 each of which has each end bifurcated at 10 to cooperate with an ear 11 projecting from the vertical guard frame 12 that is in spaced relation to each of opposite sides of the tank and is secured to the top and bottom of the tank as by welding. The ears 11 and arms of the bifurcations 10 have registering openings to receive pins or bolts 14 for mounting the bars 9 on the guard frames 12. Each bar 9 has adjacent each end thereof a clamping screw 15 to abut the door 6 at the corresponding edge portion thereof. If desired, the door may also have a pair of hinge plates 16 rigidly connected thereto and hinged to corresponding ears 11 at one side of the tank by the corresponding bolt or pin 14. In this way, the door can be hingedly mounted relatively to the tank. To open the door, the clamping screws 15 are loosened and the pins or bolts 14 on at least one side of the tank are removed so that the bars 9 can be pulled away from the end of the tank to permit the door to be removed. Where the hinge plates 16 are used, the door may be swung outwardly from the tank on the hinges.

A plurality of filter elements B are insertable into and removable from the tank through the door opening 5 and are suspended at their upper edges so that they are held in approximately parallel planes by the action of gravity. As shown, each filter element comprises a rigid rectangular open frame 17 in which is a screen 18. The rigid frame 17 is preferably channel-shaped in cross section and has portions 19 overlying opposite sides of the screen along the edges of the latter, the upper edge of the frame having outwardly diverging or inclined flanges 20 which cooperate with an inherently resilient split tubular member or header 21 which serves both as a discharge member for the filter element and for clamping the corded edge 22 of a filter bag 23 on the frame. In assembling the parts of the filter element, the filter frame is initially separated from the split tubular member 21 and the cloth bag 23 is drawn upwardly and snugly over the frame with the beaded edges at the mouth of the bag underlying the flanges 20 at opposite sides of the frame. Thereupon, the assembled bag and frame are slid into one end of the split tubular element with the free edges of the latter beneath the beads 22 on the bag, as best shown in Figure 7. The inherent resiliency of the member 21 firmly holds the bag on the frame and the beads 22 on the bag are held in contact with the walls of the header 21 which incline upwardly and outwardly from the edges of the longitudinal slot.

For mounting the filter elements in the tank, all of the headers 21 are rigidly connected together by a tie plate 24, and one end of each header is soldered in an opening 25 of a discharge manifold 26 which is mounted on the inside of the rear wall of the tank and has a discharge nipple 27 extending through said wall and on which is fitted a nut 28 for clamping the manifold in position. Cooperating with the tie plate 24 is a hanger flange 29 which is secured to and depends from the inside of the top wall of the tank, said tie plate being separably attached to said hanger flange by bolts or cap screws 30, as best shown in Figures 1 and 7. The end of each header 21 opposite the outlet manifold 25 is closed by a removable cap 31 that has a finger grip 32 for manipulating said cap. After the assembled filter elements have been slid into their respective headers 21, the caps 31 are applied to the headers, and in order to remove the filter elements from the headers, it is merely necessary to detach the caps 31 and pull the filter frames and the bags longitudinally outwardly from the headers. As shown in Figure 9, the end portions of the filter bags are abutted by the respective caps and the front walls of the outlet manifold 26, as shown in Figure 9, so as to prevent liquid from passing into the headers without passing through the filter bag.

An outlet pipe 33 is connected to the nipples 27 of the manifold and is disposed in approximate horizontal alinement with the discharge openings of the filter elements, and the inlet 34 of the tank is disposed in the top wall thereof. Accordingly, the liquid to be filtered carrying the filtering powder or compound will fill the tank and the powder will be first deposited on the upper portions of the filter bags adjacent the outlets during operation of the filter apparatus. Therefore, when the solvent is heavier than water, the water will normally rise to the top of the liquid body in the tank and the thick deposit of powder at the upper portion of the filter elements will protect the cloth of the filter bags from contact with the water. This is important, because water tends to clog the filter cloth. During continued operation of the apparatus, as the porosity of the upper portion of the filter element decreases, the powder will gradually build up on the lower portion of the filter element until the whole surface of each bag is coated with a filter medium.

When the porosity of the filter medium diminishes to a certain point, the apparatus may be back-washed in a simple and rapid manner by simply causing wash water to flow into the tank through the outlet pipe 33 through the headers 21 and backwardly or outwardly through the filter bags. This operation dislodges the powder and other accumulated matter from the bags. The non-buoyant matter will drop into a drawer or tray 35 at the bottom of the tank which preferably has a mesh or reticulated bottom 36, while the floatable or buoyant material will be carried out with the wash water through the inlet 34. After the washing operation, or at any other desired time, the tank may be drained through a drain opening 37 at the bottom of the tank which normally may be closed by a plug or valve.

To diffuse the incoming stream of liquid during the filtering operation, a plate 38 may be arranged on the headers 21 immediately below the inlet opening 34.

From the foregoing, it will be seen that the filter elements can be easily and quickly inserted in and removed from the tank; they are supported in a simple and inexpensive manner, being held in spaced relation by action of gravity so as to limit the necessity for rails or other supports at their lower edges, and the fluid passages through the apparatus are so related to the filter elements that high efficiency of operation and long life of the filter medium are ensured.

While I have shown my invention as embodied in certain details of construction, it should be understood that this is primarily for the purpose of illustrating the now preferred embodiment of the invention and that many modifications and changes can be made in the construction of the filter apparatus within the spirit and scope of the invention.

Having thus described the invention, what I claim is:

1. A filter comprising a tank having an inlet, a door in a vertical side wall and discharge passages at the side of the tank opposite said door, flat filter elements insertable edgewise into and from said tank through said door and each including a flat rigid foraminous frame and a filter bag fitted thereover and having its mouth disposed adjacent the upper edge of said frame, means for suspending said filter elements at their upper edges in said tank so that said elements are held in vertical planes perpendicular to the plane of said side wall, said last-named means including a tubular header for each filter element having a longitudinal slot, each filter element being slidable edgewise into said slot of the corresponding header with the mouth of the corresponding filter bag opening into said tubular header, one end of each header being connected to one of said discharge passages in the tank, and a seal cap at the other end of each header.

2. A filter element comprising a tank having an inlet, and a door in a vertical side wall and discharge passages at the side of the tank opposite said door, flat filter elements insertable edgewise into and from said tank through said door and each including a flat rigid foraminous frame and a filter bag fitted thereover and having a beaded edge at its mouth disposed adjacent the upper edge of said frame, means for suspending said filter elements at their upper edges in said tank so that said elements are held in vertical planes perpendicular to the plane of said side wall, said last-named means including a tubular header for each filter element having a longitudinal slot and its walls at opposite sides of said slot resilient and inclining upwardly and outwardly from the edges of the slot, each filter element being slidable edgewise into said slot of the corresponding header with the beaded edge at the mouth of the corresponding filter bag and held by the weight of the filter element in contact with said inclined walls of the header so that said bag is clamped between said header and said frame, means for mounting said headers in said tank horizontally in perpendicular relation to the plane of said wall with one end of each header connected to one of said discharge passages in the tank, and a seal cap at the other end of each header.

3. A filter as defined in claim 1 with the addition of means for securing all of said headers in said tank and including a tie plate fastened to all of the headers intermediate their ends, a hanger flange on the top wall of said tank and means connecting said tie plate to said hanger flange.

4. A filter comprising a tank having a door in a side wall, flat filter elements insertable into and removable from said tank through said door and each including a reticulated frame covered by a filter cloth, approximately parallel split tubular headers into each of which the upper edge of one filter element is fitted with said filter cloth gripped between said header and said frame, a discharge manifold in said tank opposite said door and having openings into each of which one end of one of said headers is fitted, a seal cap on the other end of each of said headers, and means for supporting said headers in said tank comprising a tie plate secured to all of said headers intermediate their ends, a hanger flange on the top wall of said tank, and means connecting said tie plate to said hanger flange.

5. A filter comprising a tank having a door in a side wall, flat filter elements insertable into and removable from said tank through said door and each including a reticulated frame covered by a filter cloth, approximately parallel split tubular headers into each of which the upper edge of one filter element is fitted with said filter cloth gripped between said header and said frame, a discharge manifold in said tank opposite said door and having openings into each of which one end of one of said headers is fitted, a seal cap on the other end of each of said headers, and means for supporting said headers in said tank comprising a tie plate secured to all of said headers intermediate their ends, a hanger flange on the top wall of said tank, and means connecting said tie plate to said hanger flange, said discharge manifold being removably mounted on one wall of and within said tank.

6. A filter comprising a tank having a door in a side wall, flat filter elements insertable into and removable from said tank edgewise through said door and each including a reticulated frame covered by a filter cloth, split tubular headers into each of which the upper edge of one filter element is fitted with said filter cloth gripped between said header and said frame, a discharge manifold in said tank opposite said door and having openings into each of which one end of one of said headers is fixedly fitted, means unitarily connecting said headers to said manifold, and means removably mounting said unitarily associated headers and manifold in said tank with said filter elements disposed edgewise to said door.

ELVIN E. HALLANDER.

REFERENCES CITED

The following references are of record in the file of this patent:

UNITED STATES PATENTS

| Number | Name | Date |
|---|---|---|
| 756,375 | Kathol | Apr. 5, 1904 |
| 869,372 | Kelly | Oct. 29, 1907 |
| 1,250,275 | Brown | Dec. 18, 1917 |
| 1,867,397 | Brace et al. | July 12, 1932 |
| 1,919,085 | Alliott | July 18, 1933 |
| 2,035,851 | Walker | Mar. 31, 1936 |
| 2,081,300 | Hopper | May 25, 1937 |
| 2,208,135 | McCormick et al. | July 16, 1940 |
| 2,301,430 | Malanowski | Nov. 10, 1942 |
| 2,374,094 | Harvout | Apr. 17, 1945 |
| 2,381,949 | Goodloe et al. | Aug. 14, 1945 |

FOREIGN PATENTS

| Number | Country | Date |
|---|---|---|
| 9,913 | France | Dec. 22, 1908 |
| 823,074 | France | Oct. 11, 1937 |
| 24,801 | Switzerland | Aug. 15, 1901 |
| 67,758 | Switzerland | Nov. 7, 1913 |